(12) United States Patent
    Wang

(10) Patent No.: US 11,142,909 B2
(45) Date of Patent: *Oct. 12, 2021

(54) MICROENCAPSULATION OF MATERIALS USING CENOSPHERES

(71) Applicant: The Board of Trustees of the University of Alabama, Tuscaloosa, AL (US)

(72) Inventor: Jialai Wang, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/573,457

(22) Filed: Sep. 17, 2019

(65) Prior Publication Data
    US 2020/0024848 A1    Jan. 23, 2020

Related U.S. Application Data

(63) Continuation of application No. 15/223,292, filed on Jul. 29, 2016, now Pat. No. 10,458,117.
    (Continued)

(51) Int. Cl.
    *C09K 5/06*    (2006.01)
    *E04C 2/26*    (2006.01)
    (Continued)

(52) U.S. Cl.
    CPC .............. *E04C 2/26* (2013.01); *B01J 13/02* (2013.01); *B05D 1/02* (2013.01); *C04B 20/1029* (2013.01);
    (Continued)

(58) Field of Classification Search
    CPC . C09K 5/063; C09K 5/02; C09K 5/06; C09K 5/14; E04C 2/26; B01J 13/02;
    (Continued)

(56) References Cited

U.S. PATENT DOCUMENTS 4,243,575 A * 1/1981 Myers ................... C08J 9/0061
                                                 521/180
4,501,830 A    2/1985 Rizer et al.
(Continued)

FOREIGN PATENT DOCUMENTS

AU        1992118188        12/1992

OTHER PUBLICATIONS

Anshits et al. "Development and Characteristics of a New Porous Glass Crystalline Matrix (Grubka) for Stabilizing Radioactive and Hazardous Solutions", Proc. Mat. Res. Soc. Symp., v. 663, 2001, p.35-42. available online Jan. 2000 (Year: 2000).*
(Continued)

*Primary Examiner* — Jane L Stanley
(74) *Attorney, Agent, or Firm* — Meunier Carlin & Curfman LLC

(57) ABSTRACT

Disclosed are methods for incorporating core materials such as phase change materials or admixtures into building materials like concrete. The methods use cenospheres, which are then etched and loaded with the core material. The composition can also be coated with a thin film. Compositions containing cenospheres loaded with the various core materials are disclosed, as are building materials containing such compositions.

10 Claims, 4 Drawing Sheets

STEP I: PRODUCE PERFORATED CENOSPHERES THROUGH ACID ETCHING

↓

STEP II: LOAD LIQUID PCMS INTO PERFORATED CENOSPHERES

↓

STEP III: SEAL THE PCMS LOADED PERFORATED CENOSPHERES WITH SPRAY-DRYING METHOD

Related U.S. Application Data

(60) Provisional application No. 62/198,997, filed on Jul. 30, 2015.

(51) Int. Cl.
| | |
|---|---|
| *C04B 28/04* | (2006.01) |
| *B05D 1/02* | (2006.01) |
| *E04C 1/40* | (2006.01) |
| *C04B 20/10* | (2006.01) |
| *C04B 20/12* | (2006.01) |
| *C04B 40/06* | (2006.01) |
| *B01J 13/02* | (2006.01) |
| *C04B 103/00* | (2006.01) |

(52) U.S. Cl.
CPC ...... *C04B 20/1033* (2013.01); *C04B 20/1066* (2013.01); *C04B 20/12* (2013.01); *C04B 28/04* (2013.01); *C04B 40/0641* (2013.01); *C09K 5/063* (2013.01); *E04C 1/40* (2013.01); *C04B 2103/0071* (2013.01); *Y02W 30/91* (2015.05)

(58) Field of Classification Search
CPC .. B01J 13/20; B01J 13/22; B05D 1/02; C04B 20/1029; C04B 20/1066; C04B 20/12; C04B 2103/0071
See application file for complete search history.

(56) References Cited

U.S. PATENT DOCUMENTS

| | | | | |
|---|---|---|---|---|
| 4,621,024 | A * | 11/1986 | Wright | C09C 1/28 |
| | | | | 428/404 |
| 5,302,634 | A | 4/1994 | Mushovic | |
| 5,899,256 | A * | 5/1999 | Rohatgi | B22D 19/14 |
| | | | | 164/97 |
| 6,444,162 | B1 | 9/2002 | Anshits et al. | |
| 6,667,261 | B1 * | 12/2003 | Anshits | C04B 38/08 |
| | | | | 501/80 |
| 7,666,505 | B2 * | 2/2010 | Datta | C04B 20/0036 |
| | | | | 428/402 |
| 8,057,594 | B2 | 11/2011 | Biju-Duval et al. | |
| 10,196,296 | B2 * | 2/2019 | Hojaji | C03B 19/10 |
| 2004/0256748 | A1 * | 12/2004 | Seok, II | B01J 13/02 |
| | | | | 264/4.1 |
| 2006/0147273 | A1 * | 7/2006 | Collins | E21B 43/01 |
| | | | | 405/210 |
| 2007/0113500 | A1 | 5/2007 | Zhao | |
| 2009/0239429 | A1 | 9/2009 | Kipp et al. | |
| 2011/0160104 | A1 | 6/2011 | Wu et al. | |
| 2013/0095995 | A1 * | 4/2013 | Shukla | C23C 18/1295 |
| | | | | 502/5 |
| 2014/0341958 | A1 * | 11/2014 | Gosselin | A61K 8/9789 |
| | | | | 424/401 |

OTHER PUBLICATIONS

Energy Information Agency. (2013d). Monthly Energy Review September, Table 2.1. Washington, DC: Energy Agency, 33 pages.
Barbare, et al., "Uptake and loss of water in a cenosphere-concrete material", Cement and Concrete Reseach vol. 33, Issue 10, Oct. 2003, pp. 1681-1686, 2003.
Biswas, et al., "Combined Experimental and Numerical Evaluation of a Prototype Nano-PCM Enhanced Wallboard", Applied Energy, 131, 2014, 517-529.
Biswas, et al., "Low-Cost Phase Change Material as an Energy Storage Medium in Building Envelopes: Experimental and Numerical Analyses", Energy Conversion and Management, 88, 2014, 1020-1031.
Dehdezia, et al., "Thermal, Mechanical and Microstructural Analysis of Concrete Containing Microencapsulated Phase Change Materials", International Journal of Pavement Engineering, 14, 2013, 449-462.
Hunger, et al., "The Behavior of Self-compacting Concrete Containing Micro-encapsulated Phase Change Materials", Cem Concr Compos 31, 731-743.
Jensen, , "Techniques and Materials for Internal Water Curing of Concrete", Materials and Structures 39, 2006, 817-825.
Kosny, et al., "Cost Analysis of Simple Phase Change Material-Enhanced Building Envelopes in Southern U.S. Climates", DOE EERE report DE-AC36-08G028308.
Zhang, et al., "Thermal and Rheological Properties of Microencapsulated Phase Change Materials", Renewable Energy 36, 2011, 2959-2966.

* cited by examiner

MICROENCAPSULATION OF MATERIALS USING CENOSPHERES

CROSS-REFERENCE TO RELATED APPLICATIONS

This application is a continuation of U.S. application Ser. No. 15/223,292 filed Jul. 29, 2016, which claims the benefit of priority to U.S. Provisional Application No. 62/198,997, filed Jul. 30, 2015, which are hereby incorporated herein by reference in their entireties.

STATEMENT OF GOVERNMENT SUPPORT

This invention was made with government support under Grant No. 23006 awarded by the National Science Foundation. The government has certain rights in the invention.

BACKGROUND

The buildings sector of the United States accounts for approximately 40% of the U.S. primary energy consumption and 39% of the U.S. carbon dioxide emissions. To cope with this challenging situation, efforts are needed to improve energy efficiency of U.S. buildings, which will not only save money for both homeowners and business owners, but also reduce the environmental impacts of energy use.

One approach to address these issues has been to incorporate phase change materials (PCMs) into construction materials to enhance the building's energy efficiency through Thermal Energy Storage (TES) and thermal regulation. PCMs change their phase from solid to liquid and vice versa at their phase change temperatures with large amount of energy absorbed or released. Thermal inertia (mass) of the building can be significantly increased by integrating PCMs into construction materials. PCMs have been considered as a promising method of TES in terms of narrowing the gap between the peak and off-peak loads of energy/electricity demand, reducing diurnal temperature fluctuations, and utilizing the free cooling at night for day peak cooling load shaving.

Two primary methods have been used to incorporate PCMs into construction materials: (1) microencapsulation of PCMs and (2) form-stable PCMs composites. In the first method, PCMs are encapsulated within a protective polymer shell. The produced microencapsulated PCMs can preserve PCMs as long as possible through the heating/cooling cycles. This microencapsulation method increases the heat transfer area, decreases the reactivity of the PCMs, limits the interaction with the construction materials, enhances the low heat conductivity, and facilitates the handling of the PCMs. However, it also suffers a few drawbacks preventing practical applications of the PCMs in construction materials. For example, the protection shell is made of polymers that usually have low mechanical stiffness and strength. As a result, the mechanical stiffness and strength of the construction materials can be reduced significantly by adding the microcapsules. The microcapsules can also been easily broken during the mixing of concrete, leading to leaking of the PCMs. The polymeric shell also has low chemical and thermal stability. It can be deteriorated by UV light, oxidation, and other aggressive chemicals. It can also lose its stability when temperature exceeds its glass transition temperature. The polymer shells can also be flammable, and therefore cannot be adopted by the building industry. Further, the thermal conductivity of the polymer shells is often very low, making thermal exchange between the PCMs inside the shell and the outside environment much more difficult.

In the second method, PCMs are first absorbed into porous materials such as light weight aggregates and diatomite particles to form stable composites, which are then added into the construction materials. When using porous particles to absorb PCM there are no protective layers on the surface of the composites. As a result, PCMs can still leak from the porous material once the temperature exceeds the phase change materials, leading to reduction or loss of the claimed thermal storage capacity.

Similar approaches have been tried when introducing materials other than PCMs into construction materials. This is especially prevalent when introducing admixtures into concrete. Incompatibility between the admixtures and hydration of cement is a major problem in the manufacture of concrete when the admixture is directly added into the mix. For example, water reducers, the most commonly used admixtures in concrete can have undesirable side effects such as rapid loss of workability, excessive quickening/retardation of setting, reduced rates of strength gain, and changes in long term behavior. Similarly, shrinkage reducing admixtures, which are used to reduce drying and autogenous shrinkage in concrete elements, can also cause side effects in concrete as they reduce the rate of cement hydration and strength development in concrete.

As a major ingredient of concrete, water is also used as an admixture in high strength concrete (HSC) to reduce autogenous shrinkage of the concrete through internal curing. Autogenous shrinkage is mainly caused by the capillary tension in the pore fluid caused by self-shrinkage. In the case of HSC with a water to cement ratio (W/C) below 0.3, the autogenous shrinkage can account for more than 50% of the total contraction deformation. Serious cracking can be induced in early-age concrete by autogenous shrinkage. These cracking problems cannot be mitigated through conventional full water curing because of HSC's compact pore structure and very low permeability. To minimize or eliminate autogenous shrinkage, additional moisture has to be provided within the concrete when it is needed. This additional moisture is essentially used as an admixture in concrete. However, it cannot be added directly into concrete during mixing because the compressive strength of HSC can be significantly reduced.

Undesirable interaction with cement hydration can prevent applications of some other admixtures in concrete. For example, bioactive agents have been shown to prevent corrosion of stainless steel and aluminum. They provide an eco-friendly method to prevent the corrosion in concrete. However, when these bioactive agents are simply mixed in with concrete, the 28-day compressive strength of the concrete was reduced by more than 60%. This is because the bioactive agents can cover the surface of cement particles and therefore prevent the cement particle from reacting with water, resulting in less CSH produced and much lower compressive strength.

As with PCMs, polymer based microcapsules or porous composites have been tried as a way incorporate admixtures into concrete without imparting undesirable effects caused by interactions with the admixture and concrete. For example, compositions that modify viscosity, impart antimicrobial properties, improve corrosion or fire resistance, or modify the water needed have been microencapsulated or adsorbed into porous composites and then mixed with concrete. As noted, however, these methods can have drawbacks such as breakage of the microcapsule, high manufacturing cost, leakage of the admixture, poor delivery of the admixture, or simply poor performance.

What are thus needed are new compositions and methods that can be used to incorporate PCMs and other admixtures into building materials such as concrete. The compositions and methods disclosed herein seek to address these and other needs.

SUMMARY

In accordance with the purposes of the disclosed materials, compounds, compositions, articles, devices, and methods, as embodied and broadly described herein, the disclosed subject matter, in one aspect, relates to compositions and methods for preparing and using the disclosed compositions. In a further aspect, disclosed herein are compositions comprising cenospheres and core materials, wherein the core material is encapsulated inside the cenosphere. In specific examples, the core material is a phase change material. This in a specific aspect, disclosed herein are compositions comprising cenospheres and PCMs, wherein the PCMs are encapsulated within the cenospheres. In further examples, the core material is an admixture, such as viscosity modifiers, antimicrobial agents, corrosion inhibitors, fire retardants, water, air, and the like. Thus in a further aspect, disclosed are compositions comprising cenospheres and any of such admixtures, where the admixtures are encapsulated inside the cenosphere. Methods of using cenospheres to encapsulate core materials like PCMs and other admixtures are also disclosed. Also, methods of adding the disclosed compositions to building materials such as concrete, and the materials produced thereby, are disclosed.

Additional advantages of the disclosed subject matter will be set forth in part in the description that follows, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects of the disclosure and together with the description, serve to explain the principles of the disclosure.

FIG. 2A is an image of the impermeable shell before etching. FIG. 2B is an image of the porous shell of the cenosphere. FIG. 2C is an image of the perforated shell after etching with 1.0 M $NH_4F$-1.2 M HCl—$H_2O$ for 2 hours.

FIG. 3A shows that before loading, cenospheres float on the liquid PCM. FIG. 3B shows that after the cenospheres are filled with the PCM, they settle down at the bottom of the container.

FIG. 5A is an image of Micronale, a product of BASF.

FIG. 5B is an image of a commercially available microencapsulated PCM produced by CIBA, UK. FIG. 5C is an image of CenoPCM. FIG. 5D is an image of cenoPCM used in concrete.

FIG. 6A is a DSC measurement of CenoPCM. FIG. 6B is a graph of TGA results of unsealed CenoPCM.

FIG. 9A is a CenoPCM coated with a thin layer of nano-silica. FIG. 9B shows CenoPCMs coated with a polymer.

FIG. 11A is a concrete without internal curing with significant amount of drying shrinkage cracks. FIG. 11B is a concrete with cenospheres as internal curing agent showing cenospheres are evenly dispersed in concrete and much less drying shrinkage cracks. FIG. 11C is a broken cenosphere in concrete showing water is released and very dense hydration products around it.

DETAILED DESCRIPTION

The materials, compounds, compositions, articles, and methods described herein may be understood more readily by reference to the following detailed description of specific aspects of the disclosed subject matter and the Examples and Figures included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

A weight percent (wt. %) of a component, unless specifically stated to the contrary, is based on the total weight of the formulation or composition in which the component is included.

Reference will now be made in detail to specific aspects of the disclosed materials, compounds, compositions, articles, and methods, examples of which are illustrated in the accompanying Examples and Figures.

Compositions

Disclosed herein are compositions that comprise a core material encapsulated within cenospheres.

Figures 2A, 2B, 2C:
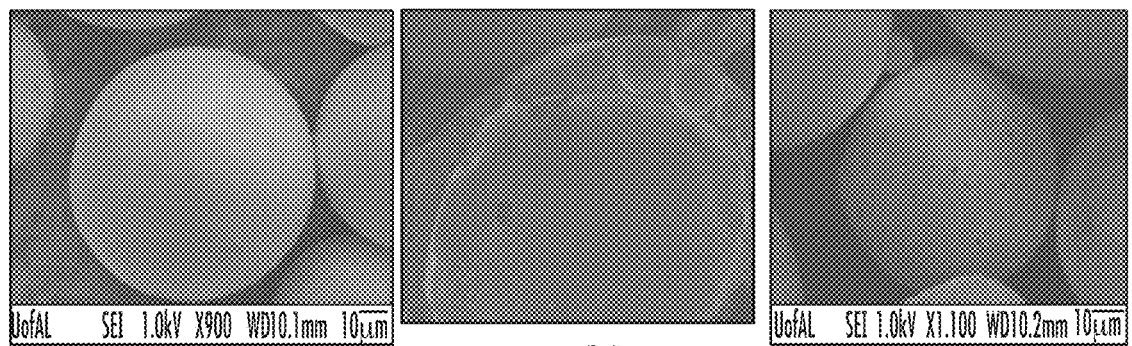
FIGS. 2A through 2C are SEM images showing perforated cenosphere produced by acid etching.

Cenospheres are hollow inorganic particles generated in coal burning power plants with size ranging from a few micrometers to hundreds of micrometers, as shown in FIG. 2A. Cenospheres typically make up around 1-2% of the fly ash and can be recovered or "harvested" from the fly ash. These cenospheres derived from coal combustion are commercially available. A cenosphere is thus an industrial waste material and their use in the disclosed compositions provides a unique advantage in that they are being reused in a beneficial way, rather than being discarded. A cenosphere has an aluminosilicate shell with high stiffness and strength and a thickness in a few micrometers. The shell has a porous structure formed by gas inclusion and is covered by a glass-crystalline nanosize film, as shown in FIG. 2B. Cenospheres have been used in construction materials for decades to produce lightweight materials. These cenospheres were hollow and no method had been available to incorporate a material into the cenospheres was available. This is because the shell of the cenosphere is covered by a glass-crystalline nanosize film, as shown in FIG. 2A, making the inner volume of the cenosphere inaccessible. The disclosed methods have overcome this barrier and incorporate core material into the inner volume of the cenosphere.

In the disclosed compositions, the cenosphere can have an average diameter of from about 1 μm to about 2,000 μm, from about 20 μm to about 1,000 μm, or from about 30 μm to about 80 μm. In further examples, the average diameter of the cenosphere can be about 1, 10, 20, 30, 40, 50, 60, 70, 80, 90, 200, 300, 400, 500, 600, 700, 800, 900, 1000, 1200, 1300, 1400, 1500, 1600, 1700, 1800, 1900, or 2000 μm, where any of the stated values can form an upper or lower endpoint when appropriate.

The payloads of the core material inside the cenospheres can be from about 20% to about 90%, about 50% to about 70% by weight, or about 60% by weight of the composition (core material plus cenosphere). In other examples, the disclosed compositions can contain about 20, 25, 30, 35, 40, 45, 50, 55, 60, 65, 70, 75, 80, 85, or 90% core material by weight of the composition, where any of the stated values can form an upper or lower endpoint when appropriate.

The disclosed compositions can also comprise a majority of intact, loaded, cenospheres. That is, before preparing the disclosed compositions the cenosphere based starting material can be filtered to remove the broken cenospheres. This can be done via water filling under vacuum followed by gravity separation. Thus, intact cenospheres are isolated and used. In certain examples, this means the final cenosphere composition, after loading, can comprise at least about 50, 60, 70, 80, or 90% by weight intact cenospheres.

The disclosed compositions can also comprise an outer coating on the cenosphere. Suitable outer coatings include silica, alumina, or titania.

PCMs

In one aspect, the disclosed compositions comprise a PCM as the core material that is inside a cenosphere. These are denoted herein as "CenoPCMs."

A PCM is a composition with high latent heat that undergoes a phase change at a desired temperature. For example, when a PCM freezes, changing from liquid to solid, it releases large amounts of energy in the form of latent heat of fusion. When the material melts, an equal amount of energy is absorbed from the environment as it changes from solid to liquid. Likewise, when a PCM condenses from gas to liquid it releases large amounts of energy in the form of latent heat of vaporization, absorbing an equal amount of energy from the environment as it boils, changing from liquid to gas.

In specific examples, a suitable PCM for the disclosed CenoPCMs can comprise water, a salt-water solution, a sugar alcohol, a paraffin, a fatty acid, a salt hydrate, a nitrate, a hydroxide, a hygroscopic material, or combinations thereof. More specifically, the PCM can be urea; ureidopyrimidone; N,N-dialkylpiperidinum; N,N-dialkylpyrrolidinium; LiF and $BeF_2$; NaF and $BeF_2$; LiF and NaF and KF; NaF and $ZrF_4$; $KNO_3$ and KCl; $KNO_3$ and $K_2CO_3$; LiBr and KBr; $KNO_3$ and KBr; $KNO_3$ and LiOH; $FeCl_2$ and KCl; KCl and LiCl; $K_2CO_3$ and KOH; $K_2SO_4$ and KOH; $FeCl_2$ and NaCl; KCl and $MnCl_2$; LiBr and LiI; KCl—$MgCl_2$; $MnCl_2$ and NaCl; $LiCO_3$ and LiOH; LiBr and LiF; NaCl and $MgCl_2$; $K_2CO_3$ and $MgCO_3$; KF and $KBF_4$; $Na_2SO_4$ and $ZnSO_4$; $CaCl_2$ and LiCl; LiCl and $Li_2SO_4$; KF and LiF; $K_2CO_3$ and $Li_2CO_3$; $Li_2CO_3$ and $Na_2CO_3$; LiCl and LiF; $CaCl_2$ and NaCl; $KVO_3$ and $BaTiO_3$; KCl and LiBr and NaBr; KBr and LiCl and NaCl; LiBr and NaBr and KBr; NaOH and NaCl and $Na_2CO_3$; KCl and LiCl and $Li_2SO_4$; $MgCl_2$ and KCl and NaCl; NaCl and KCl and $FeCl_2$; KCl and LiCl and $CaF_2$; $CaCl_2$ and KCl and LiCl; NaCl and KCl and LiCl; KF and $AlF_3$ and $ZrF_4$; $MnCl_2$ and KCl and NaCl; $Na_2SO_4$ and $K_2SO_4$ and $ZnSO_4$; $Na_2CO_3$ and $K_2CO_3$ and $ZnSO_4$; $Na_2CO_3$ and $K_2CO_3$ and $LiCO_3$; KCl and NaCl and LiF; LiCl and NaCl and $Li_2SO_4$; LiCl and KCl and $CaCl_2$ and $CaF_2$; KCl and NaCl and LiCl and $Li_2SO_4$; $NaNO_3$; $KNO_3$; $KNO_3$ and KCl; $KNO_3$ and $K_2CO_3$; $KNO_3$ and KBr; $FeCl_2$ and KCl; KCl and LiCl; $K_2CO_3$ and KOH; $K_2SO_4$ and KOH; $FeCl_2$ and NaCl; LiBr and KBr; NaOH and NaCl and $Na_2CO_3$; $MgCl_2$ and KCl and NaCl; NaCl and KCl and $FeCl_2$; $CaCl_2$ and KCl and LiCl; $MgCl_2$ and KCl and NaCl; $MgCl_2$ and KCl and NaCl; NaOH and NaCl and $Na_2CO_3$; $MnCl_2$ and KCl and NaCl; $Na_2CO_2$ and $K_2CO_3$ and $Li_2CO_3$; LiF and LiCl and $LiVO_3$ and $Li_2SO_4$ and $Li_2MoO_4$; LiF and LiCl and $Li_2SO_4$ and $Li_2MoO_4$; LiF and KF and $KCO_4$ and KCl; LiF and LiOH; LiF and $BaF_2$ and KF and NaF; LiF and KF and NaF and KCl; LiF and NaF and KF and $MgF_2$; LiF and NaF and KF; LiF and KF and NaF; LiF and NaF and KF; LiF and LiCl; KF and LiCl; KF and LiCl; LiF and KF; LiF and $LiVO_3$ and $Li_2MoO_4$; LiCl and KCl and $LiCO_3$ and LiF; LiCl and KCl; KCl and $MnCl_2$ and NaCl; LiClLiVO$_3$ and $Li_2MoO_4$ and $Li_2SO_4$ and LiF; NaCl and KCl and $MgCl_2$; KCl and $MgCl_2$ and NaCl; NaCl and $MgCl_2$; KCl and $ZnCl_2$; KCl and $MgCl_2$; NaCl═$MgCl_2$; LiCl and $Li_2SO_4$ and $Li_2MoO_4$; KCl and $MnCl_2$; LiCl and $Li_2SO_4$ and LiVO$_3$; KCl and MnCl$_2$; NaCl and MgCl$_2$; CaCl$_2$ and KCl and NaCl and NaF; CaCl$_2$ and KCl and MgCl$_2$ and NaCl; CaCl$_2$ and KCl and NaCl; KCl and MgCl$_2$; LiCl and LiF and MgF$_2$; CaCl$_2$ and CaF$_2$ and NaF; CaCl$_2$ and NaCl; NaOH and NaCl and Na$_2$CO$_3$; LiOH and LiF; Li$_2$CO$_3$ and K$_2$CO$_3$ and Na$_2$CO$_3$; Li$_2$CO$_3$ and K$_2$CO$_3$; Li$_2$CO$_3$ and K$_2$CO$_3$; Zn and Mg; Al and Mg and Zn; Mg and Cu and Zn; Mg and Cu and Ca; Mg and Al; formic acid; caprilic acid; glycerin; D-Lactic acid; methyl palmitate; camphenilone; docasyl bromide; caprylone; phenol; heptadecanone; 1-cyclohexylooctadecane; 4-heptadacanone; p-joluidine; cyanamide; methyl eicosanate; 3-heptadecanone; 2-heptadecanone; hydrocinnamic acid; cetyl alcohol; α-nepthylamine; camphene; O-nitroaniline; 9-heptadecanone; thymol; sodium acetate; trimethylolethane; methylbehenate; diphenyl amine; p-dichlorobenzene; oxalate; hypophosphoric acid; O-xylene dichloride; β-chloroacetic acid; nitro naphthalene; trimyristin; heptaudecanoic acid; α-chloroacetic acid; bee wax; bees wax; glycolic acid; glyolic acid; p-bromophenol; azobenzene; acrylic acid; dinto toluent; phenylacetic acid; thiosinamine; bromcamphor; durene; benzylamine; methyl bromobenzoate; alpha napthol; glautaric acid; p-xylene dichloride; catechol; quinine; acetanilide; succinic anhydride; benzoic acid; stibene; benzamide; acetic acid; polyethylene glycol; capric acid; eladic acid; lauric acid; pentadecanoic acid; trustearin; myristic acid; palmatic acid; stearic acid; acetamide; methyl fumarate; K$_2$HPO$_4$.6H$_2$O; FeBr$_3$.6H$_2$O; Mn(NO$_3$)$_2$.6H$_2$O; FeBr$_3$.6H$_2$O; CaCl$_2$.12H$_2$O; LiNO$_3$.2H$_2$O; LiNO$_3$.3H$_2$O; Na$_2$CO$_3$.10H$_2$O; Na$_2$SO$_4$.10H$_2$O; KFe(SO$_4$)$_2$.12H$_2$O; CaBr$_2$.6H$_2$O; LiBr$_2$.2H$_2$O; Zn(NO$_3$)$_2$.6H$_2$O; FeCl$_3$.6H$_2$O; Mn(NO$_3$)$_2$.4H$_2$O; Na$_2$HPO$_4$.12H$_2$O; CoSO$_4$.7H$_2$O; KF.2H$_2$O; MgI$_2$.8H$_2$O; CaI$_2$.6H$_2$O; K$_2$HPO$_4$.7H$_2$O; Zn(NO$_3$)$_2$.4H$_2$O; Mg(NO$_3$).4H$_2$O; Ca(NO$_3$).4H$_2$O; Fe(NO$_3$)$_3$.9H$_2$O; Na$_2$SiO$_3$.4H$_2$O; K$_2$HPO$_4$.3H$_2$O; Na$_2$S$_2$O$_3$.5H$_2$O; MgSO$_4$.7H$_2$O; Ca(NO$_3$)$_2$.3H$_2$O; Zn(NO$_3$)$_2$.2H$_2$O; FeCl$_3$.2H$_2$O; Ni(NO$_3$)$_2$.6H$_2$O; MnCl$_2$.4H$_2$O; MgCl$_2$.4H$_2$O; CH$_3$COONa.3H$_2$O; Fe(NO$_3$)$_2$.6H$_2$O; NaAl(SO$_4$)$_2$.10H$_2$O; NaOH.H$_2$O; Na$_3$PO$_4$.12H$_2$O; LiCH$_3$COO.2H$_2$O; Al(NO$_3$)$_2$.9H$_2$O; Ba(OH)$_2$.8H$_2$O; Mg(NO$_3$)$_2$.6H$_2$O; KAl (SO$_4$)$_2$.12H$_2$O; MgCl$_2$.6H$_2$O; gallium-gallium antimony eutectic; gallium; cerrolow eutectic; Bi—Cd—In eutectic; cerrobend eutectic; Bi—Pb—In eutectic; Bi—In eutectic; Bi—Pb-tin eutectic; Bi—Pb eutectic; CaCl$_2$.6H$_2$O and CaBr$_2$.6H$_2$O; Triethylolethane and water and urea; C$_{14}$H$_{28}$O$_2$ and C$_{10}$H$_{20}$O$_2$; CaCl$_2$ and MgCl$_2$.6H$_2$O; CH$_3$CONH$_2$ and NH$_2$CONH$_2$; Triethylolethane and urea; Ca(NO$_3$).4H$_2$O and Mg(NO$_3$)$_3$.6H$_2$O; CH$_3$COONa.3H$_2$O and NH$_2$CONH$_2$; NH$_2$CONH$_2$ and NH$_4$NO$_3$; Mg(NO$_3$)$_3$.6H$_2$O and NH$_4$NO$_3$; Mg(NO$_3$)$_3$.6H$_2$O and MgCl$_2$.6H$_2$O; Mg(NO$_3$)$_3$.6H$_2$O and MgCl$_2$.6H$_2$O; Mg(NO$_3$)$_3$.6H$_2$O and Al(NO$_3$)$_2$.9H$_2$O; CH$_3$CONH$_2$ and C$_{17}$H$_{35}$COOH; Mg(NO$_3$)$_2$.6H$_2$O and MgBr$_2$.6H$_2$O; Napthalene and benzoic acid; NH$_2$CONH$_2$ and NH$_4$Br; LiNO$_3$ and NH$_4$NO$_3$ and NaNO$_3$; LiNO$_3$ and NH$_4$NO$_3$ and KNO$_3$; LiNO$_3$ and NH$_4$NO$_3$ and NH$_4$Cl; or combinations thereof.

In some examples, the melting temperature of the PCM can be at least about −100° C. (e.g., at least about −50° C., at least about 0° C., at least about 50° C., at least about 100° C., at least about 150° C., at least about 200° C., at least about 250° C., at least about 300° C., at least about 350° C. or at least about 400° C.). In some embodiments, the melting temperature of the PCM can be about 400° C. or less (e.g., about 350° C. or less, about 300° C. or less, about 250° C. or less, about 200° C. or less, about 150° C. or less, about 100° C. or less, about 50° C. or less, about 0° C. or less, or about −50° C. or less). The melting temperature of the PCM can range from any of the minimum temperatures described above to any of the maximum temperatures described above. For example, the melting temperature of the PCM can range from about −100° C. to about 400° C. (e.g., from about 0° C. to about 300° C., or from about 100° C. to about 200° C.)

In certain embodiments, the PCM comprises a salt water solution, and has a melting temperature of from about −100° C. to about 0° C. In some embodiments, the PCM comprises a paraffin, and has a melting temperature of from about 0° C. to about 150° C. In some embodiments, the phase change material is a salt hydrate with a melting temperature of 50° C. to 100° C. In some embodiments, the phase change material comprises a sugar alcohol, and has a melting temperature of from about 50° C. to about 225° C. In some embodiments, the phase change material comprises a nitrate, and has a melting temperature of from about 150° C. to about 300° C. In some embodiments, the phase change material comprises a hydroxide, and has a melting temperature of from about 200° C. to about 400° C.

In some embodiments, the melting enthalpy of the PCM can be at least about 100 MJ/m$^3$ (e.g., at least about 150 MJ/m$^3$, at least about 200 MJ/m$^3$, at least about 250 MJ/m$^3$, at least about 300 MJ/m$^3$, at least about 350 MJ/m$^3$, at least about 400 MJ/m$^3$, at least about 450 MJ/m$^3$, at least about 500 MJ/m$^3$, at least about 550 MJ/m$^3$, at least about 600 MJ/m$^3$, or at least about 650 MJ/m$^3$). In some embodiments, the melting enthalpy of the PCM can be about 100 MJ/m$^3$ or less (e.g., about 650 MJ/m$^3$ or less, about 600 MJ/m$^3$ or less, about 550 MJ/m$^3$ or less, about 500 MJ/m$^3$ or less, about 450 MJ/m$^3$ or less, about 400 MJ/m$^3$ or less, about 350 MJ/m$^3$ or less, about 300 MJ/m$^3$ or less, about 250 MJ/m$^3$ or less, about 200 MJ/m$^3$ or less, or about 150 MJ/m$^3$ or less). The melting enthalpy of the PCM can range from any of the minimum values described above to any of the maximum values described above. For example, the melting enthalpy of the PCM can range from about 100 MJ/m$^3$ to about 100 MJ/m$^3$ (e.g., from about 200-400 MJ/m$^3$).

In some embodiments, the phase change material comprises a salt water solution, and has a melting enthalpy of from about 150 MJ/m$^3$ to about 300 MJ/m$^3$. In some embodiments, the phase change material comprises a paraffin, and has a melting enthalpy of from about 150 MJ/m$^3$ to about 200 MJ/m$^3$. In some embodiments, the phase change material comprises a salt hydrate, and has a melting enthalpy of from about 200 MJ/m$^3$ to about 600 MJ/m$^3$. In some embodiments, the phase change material comprises a sugar alcohol, and has a melting enthalpy of from about 200 MJ/m$^3$ to about 400 MJ/m$^3$. In some embodiments, the phase change material comprises a nitrate, and has a melting enthalpy of from about 200 MJ/m$^3$ to about 600 MJ/m$^3$. In some embodiments, the phase change material comprises a hydroxide, and has a melting enthalpy of from about 450 MJ/m$^3$ to about 700 MJ/m$^3$.

As a result the CenoPCMs have several beneficial properties that make them useful for building materials. For examples, the disclosed CenoPCMs can have high stiffness/strength. The cenosphere shell of a CenoPCM has much higher stiffness/strength than a polymeric shell used in existing microencapsulated PCMs. As a result, CenoPCM can endure strong mixing during the manufacturing of the materials, and will not significantly reduce stiffness/strength of the produced materials.

The disclosed CenoPCMs can also have high chemical and thermal stability. Since cenospheres are hollow fly ash particles, they have the same chemical and thermal stability as fly ash. When used in concrete, they can react slowly with the hydration product of Portland cement. This reaction will generate calcium silicate hydrate gel (CSH gel), which can make the CenoPCM shell even stronger.

The disclosed CenoPCMs can also have low flammability. Cenospheres are nonflammable and therefore can reduce the flammability of the PCM core, so that the disclosed CenoPCMs can be accepted by US building industry.

The disclosed CenoPCMs can also have high thermal conductivity. Since cenospheres are inorganic, their thermal conductivity is much higher than the organic polymeric shells used in existing microencapsulated PCMs, making thermal exchange between PCMs inside the shell and outside environment much easier and faster.

With all these advantages, CenoPCM can eliminate major barriers preventing application of PCMs in traditional building materials. For example, CenoPCM can be integrated into construction and building materials to improve energy efficiency of buildings.

Also, disclosed are various building materials that comprise the disclosed CenoPCMs. For example, disclosed herein is a composition comprising cement and the disclosed CenoPCMs. Also, disclosed herein is a composition comprising an insulating material and the disclosed CenoPCMs. Still further, disclosed herein is a composition comprising a roofing material and the disclosed CenoPCMs. In a further example, disclosed herein is a flooring material (e.g., tile, porcelain, linoleum, engineered hardwood) that comprises the disclosed CenoPCMs. In still a further example, disclosed herein is a wall material (e.g., gypsum, drywall, plaster, stucco, PVC) that comprises the disclosed CenoPCMs.

Other Admixtures

In another aspect, the disclosed compositions comprise an admixture as the core material that is inside a cenosphere. One type of admixture that can be included is an antimicrobial agent. Any antimicrobial agent that can prevent or reduce microbial growth in the disclosed compositions can be used. Examples of suitable antimicrobial materials include metals such as copper, zinc, or silver and/or salts thereof. Further examples of suitable antimicrobial agents include natural and synthetic organic compositions such as β-lactam antibiotics like penicillin or cephalosporin, and protein synthesis inhibitors like neomycin. Antimicrobial agents such as lactic acid, acetic acid, or citric acid can also be used. In some other examples, an antimicrobial agent can comprise a quarternary ammonium compound such as benzalkonium chloride, benzethonium chloride, methylbenzethonium chloride, cetylalkonium chloride, cetylpyridinium chloride, cetrimonium, cetrimide, dofanium chloride, tetraethylammonium bromide, didecyldimethylammonium chloride, and domiphen bromide. The antimicrobials can be used in effective amounts, e.g., an amount that will prevent or reduce microbial growth. Thus disclosed herein are compositions comprising a cenosphere and an antimicrobial agent, wherein the antimicrobial agent is encapsulated inside the cenosphere.

Another suitable admixture that can be used in the disclosed compositions is a fire retardant. Suitable fire retardants can comprise an organic composition or an inorganic composition. In some examples, a suitable fire retardant such as tris(2-chloro-1-(chloromethyl)ethyl)phosphate, aluminum hydroxide, magnesium hydroxide. In some embodiments, a fire retardant can comprise a zeolite. The fire retardants can be used in effective amounts, e.g., an amount that will prevent or reduce combustion. Thus disclosed herein are compositions comprising a cenosphere and a fire retardant, wherein the fire retardant is encapsulated inside the cenosphere.

Still further, another suitable admixture that can be used in the disclosed compositions is a corrosion inhibitor such as sodium sulfite, chromates, and polyphosphates. Thus disclosed herein are compositions comprising a cenosphere and a corrosion inhibitor, wherein the corrosion inhibitor is encapsulated inside the cenosphere.

In yet another example, the disclosed compositions can comprise water as an admixture. This composition can be used to promote self curing properties into concrete. Thus disclosed herein are compositions comprising a cenosphere and water, wherein the water is encapsulated inside the cenosphere.

In still another example, the disclosed compositions can comprise a water reducer as an admixture. Thus disclosed herein are compositions comprising a cenosphere and a water reducer, wherein the water reducer is encapsulated inside the cenosphere. Examples of water reducers are lignosulphonates, hydroxycarboxylic acids, carbohydrates, and other specific organic compounds, for example glycerol, polyvinyl alcohol, sodium alumino-methyl-siliconate, sulfanilic acid and casein as described in the Concrete Admixtures Handbook, Properties Science and Technology, V. S. Ramachandran, Noyes Publications, 1984.

In yet another example, the disclosed compositions can comprise a viscosity modifier as an admixture. Cellulose, PEG—Glycol derivative, Natural Gums, amorphous silica, and the like. Thus disclosed herein are compositions comprising a cenosphere and a viscosity modifier, wherein the viscosity modifier is encapsulated inside the cenosphere.

In yet another example, the admixture can be a superplasticizer, such as a polyacrylate aqueous solution. Thus disclosed herein are compositions comprising a cenosphere and a superplasticizer, wherein the superplasticizer is encapsulated inside the cenosphere.

In yet another example, the admixture can be air. Thus disclosed herein are compositions comprising an empty perforated cenosphere, wherein air is encapsulated inside the cenosphere.

Other examples of admixtures that can be incorporated into cenospheres are listed below.

| | |
|---|---|
| Freeze and freeze-thaw resistance | Sterically or electrostatically repelling monomers |
| Shrinkage and degradation resistance | Mineral oils or surfactants |
| Low hydration heat release | Heat retarding agents |
| Low water absorption | Polyurethane |
| Noise absorption/insulation | Organic solvent with magnetic particles |
| Reversible color changes | Thermochromic materials |
| Self-healing | Healing agents |

Methods

Figure 1:
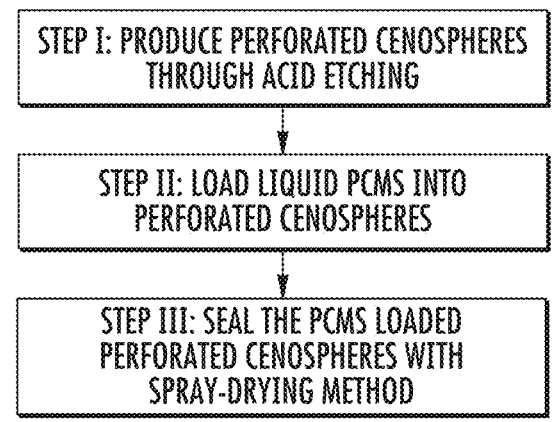
FIG. 1 is a schematic illustrating the general steps for preparing the disclosed CenoPCMs.

The disclosed compositions can be prepared by a method generally illustrated in FIG. 1. While this method is illustrated with PCM as the core material, other core materials or admixtures disclosed herein can be used. In the first step, perforated cenospheres can be produced through acid etching. To introduce PCM into a cenosphere, the glass-crystalline nanosize film on the surface of the cenosphere must be removed. This can be done through acid etching, e.g., using 1.0 M $NH_4F$-1.2 M HCl—$H_2O$ for 2 hours. After removing the nanosize film, perforated cenospheres with very small holes (smaller than 2 µm) penetrating through the shell can be produced (FIG. 2C).

The acid solution can contain be a hydrofluoric acid based solution. For example, solutions of hydrofluoric acid and ammonium hydroxide (e.g., comprising ammonium fluoride, HF, water) can be used. Other hydrofluoric acid solutions can be used as well, e.g., those comprising hydrofluoric acid and hydrochloric acid, to produce perforated cenospheres.

Figures 3A, 3B:
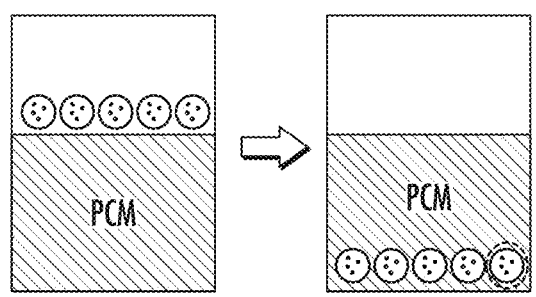
FIGS. 3A and 3B are schematics illustrating the general steps for loading liquid PCM into perforated cenospheres.

Next, liquid PCMs are loaded into the perforated cenospheres (FIGS. 3A and 3B). In the following examples, paraffin waxes (n-alkanes) are loaded, though any PCM can be used. Paraffin waxes have phase-change temperatures of 18-36° C. and can change phases within this temperature range, making humans feel comfortable. Therefore, they can be used to integrate construction materials to regulate the temperature of the building. Loading Paraffin wax into perforated cenospheres can be done by mixing cenospheres in liquid wax to let liquid wax penetrate into the hollow cenospheres. Before loading with liquid wax, cenospheres can float on liquid wax as shown in FIG. 3A. After loading, cenospheres settle down at the bottom of the container as shown in FIG. 3B. After loading, the extra paraffin wax absorbed on the surface of the cenospheres can be washed by distilled water before it changes its phase to solid, or can be washed using organic solvent such as acetone after it is solidified.

Figure 4:
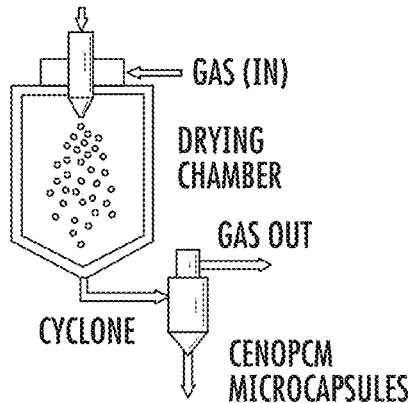
FIG. 4 is a schematic illustrating a spray-drying method to a seal the perforated cenospheres with sodium silicate.

A thin layer of silica can be coated on the PCM loaded cenospheres to prevent the possible leaking of the liquid PCM, as shown in FIG. 4. This coating can be applied by spray-drying method as shown in FIG. 4. For example, PCM loaded cenospheres can be mixed with commercially available silica sol and then sprayed into the drying chamber, in which the silica sol is heated to form a very thin layer of silica. This layer of silica can not only seal the perforated holes on the cenosphere shells, but also strengthen the cenosphere shells. This process can be performed with other materials as well, such as alumina or titania.

Figure 8:
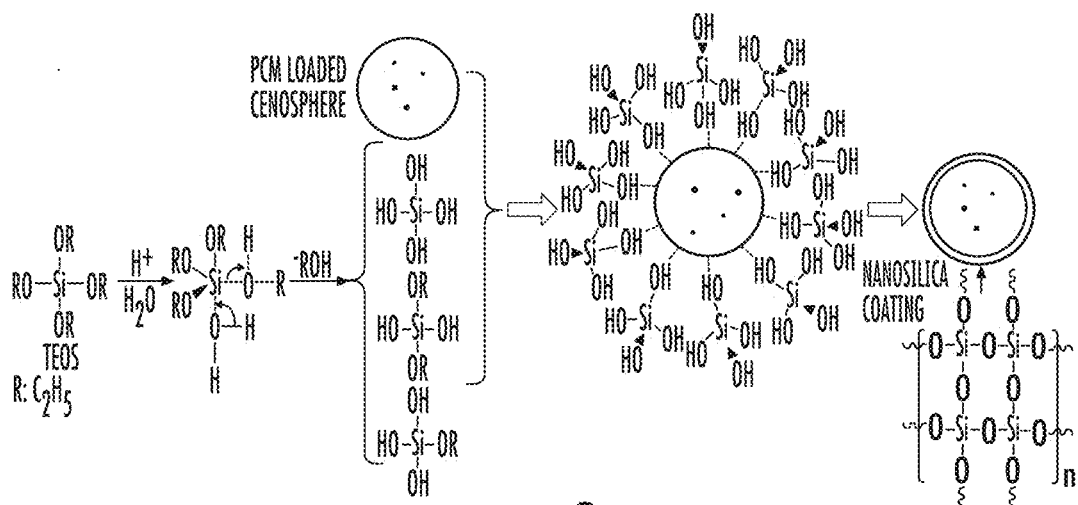
FIG. 8 is a schematic of the formation of nanosilica coating on a cenosphere through sol-gel process.

The sol-gel method can also be used to prepare the silica nanoparticle solution. Tetraethoxysilane (TEOS) can be used as the precursor for sol-gel synthesis since it reacts readily with water with either a basic or acidic catalyst. This reaction is called hydrolysis, because a hydroxyl ion becomes attached to the silicon atom. The process comprises a series of hydrolysis and condensation reactions of the TEOS, as shown in FIG. 8. Sol-gel reactions do not require extreme reaction conditions. The reactions can take place at room temperature and require only moderate temperatures to 'cure' the gel, which can easily remove the excess materials generated by the reaction. In this method, silica sol can be prepared through hydrolysis of TEOS with ammonium hydroxide or a nitric acid solution as catalyst. Then a dip coating method can be used to apply the silica sol on the surface of cenospheres to form a porous thin film of nano-silica.

Alternatively, a thin layer of $TiO_2$ can also be coated on censpheres to add a self-cleaning function to the concrete. This thin layer of nanoparticle coating can be applied before or after the loading of the admixture, depending on the nature of the intended application.

In addition, a thin layer of polymer can also be coated on the cenosphere to seal the perforated cenosphere shell. Any polymer which sufficiently adheres to the cenosphere shell can be used for coating.

The disclosed methods can also comprise the step of adding the disclosed compositions into a building material, such as concrete, mortar, cement, asphalt, tar, tile, brick, ceramics, gypsum, plaster, stucco, porcelain, linoleum, engineered hardwoods, PVC, insulation, roofing and flooring materials, and the like. A recent Oak Ridge National Laboratory (ORNL) study indicated that PCM integrated wallboard can result in up to 22% electricity savings from wall-generated cooling loads (Biswas et al., 2014. Applied Energy, 131,517-529). Another study showed both cooling and heating energy savings are achievable with distributed PCM mixed with cellulose insulation in wall cavities (Biswas et al., 2014 Energy Conversion and Management, 88, 1020-1031).

In one specific example, the disclosed methods comprise adding the disclosed compositions to concrete. Portland cement-based concrete (PCC) is the most widely used construction material in our civil infrastructure system, accounting for 70% of all building and construction materials. Manufacturing of PCC not only consumes large amounts of natural resources, but also produces considerable greenhouse gases. Cement production in the U.S. accounts for up to 7% of the nation's total $CO_2$ emissions. PCC is also susceptible to deterioration when exposed to harsh environments. Low tensile strength, high brittleness, and low volume stability make PCC vulnerable to cracking. PCC's higher permeability, porous microstructure, and thermodynamically unstable chemical compounds such as calcium silicate hydrate (CSH) make it susceptible to acid and sulfate attack. Deterioration of PCC has emerged as one of the largest challenges in maintaining and protecting the U.S. civil infrastructure system.

To this end, the disclosed compositions can be a versatile low cost tool for concrete manufacturing that minimizes or avoids undesired interactions between the admixtures and hydration of cement through the controlled release of admixture or through sealing the admixtures in concrete. The disclosed compositions can load and then release or seal the admixtures within concrete as needed. As a result, optimal effects of the admixture can be reached and/or new desirable functions can be added to concrete.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, pH, etc.) but some errors and deviations should be accounted for. Unless indicated otherwise, parts are parts by weight, temperature is in ° C. or is at ambient temperature, and pressure is at or near atmospheric. There are numerous variations and combinations of conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

A commercially obtained cenosphere (FIGS. 2A and 2B) was etched with acid to remove the glass-crystalline nanosize film on the surface. Before each acid treatment, cenospheres that were formed with natural perforations during the combustion process were removed from the bulk material via water filling under vacuum followed by gravity separation. Only the cenospheres with complete shell were selected for etching, shown as in FIG. 2A. After etching in 1.0 M NH4F-1.2 M HCl—H2O solution for 2 hours, the cenospheres were vacuum filtered and rinsed with water to remove the residual acid. The collected and washed spheres were then soaked in water to separate the ones floating on the surface from the ones sinking to the bottom. The sinking ones were perforated cenospheres and they were collected and then dried in oven at 100° C. for 24 hours. The etching resulted in a perforated cenosphere (FIG. 2C). The perforated cenosphere was then added to water as the core material. The loaded cenosphere precipitated to the bottom of the vessel. It was determined that the water absorption of the perforated cenosphere could reach as high as 180%, which is much higher than that of light weight aggregates typically used. This percentage ratio is the weight of water absorbed by the cenosphere to the weight of the cenosphere. For example, in this example, one pound perforated cenospheres can absorb 1.8 pound of water.

Example 2

The same procedure as Example 1 was followed except that paraffin waxes were used as the core material.

Figure 6A:
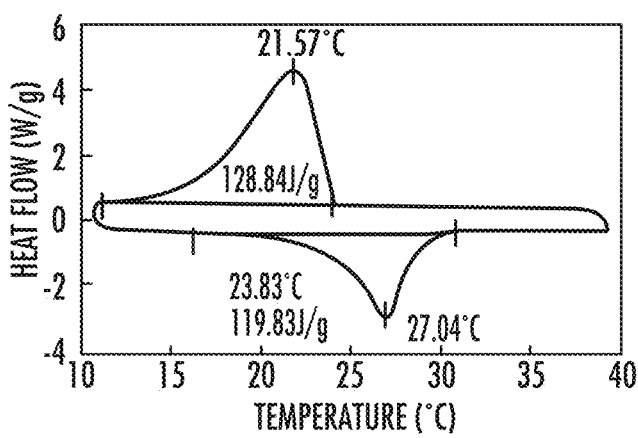
FIGS. 6A and 6B are graphs from experiments characterizing CenoPCM.

FIG. 6A, shows Differential Scanning calorimetry (DSC) testing results on the CenoPCM. The following procedure was used to perform the DSC measurement: heating/cooling rate=5° C./min, temperature program-scan started at 10° C. and was complete at 50° C. A continuous ascending and descending scan was utilized during dynamic DSC testing. Panel (a) indicates that the peak melting and freezing temperatures and the latent heats of the CenoPCM are 23.83° C., 21.57° C., 119.83 J/g, 128.04 J/g, respectively. Table 1 compares latent heats of the CenoPCM with two commercially available microencapsulated PCMs (Zhang, et al., Thermal and rheological properties of microencapsulated phase change materials. *Renewable Energy* 2011; 36:2959-2966). Table 1 shows that compared with these commercially available microencapsulated PCMs, CenoPCM is superior in latent heat storage capacity.

TABLE 1

Comparison of latent heat of CenoPCMs with commercially available MEPCMs

| Microcapsule name | Melting latent heat (J/g) | Freezing latent heat (J/g) |
|---|---|---|
| 1 | 102.01 | 106.4 |
| 2 | 96.97 | 101.01 |
| CenoPCM | 119.83 | 128.04 |

Figure 6B:
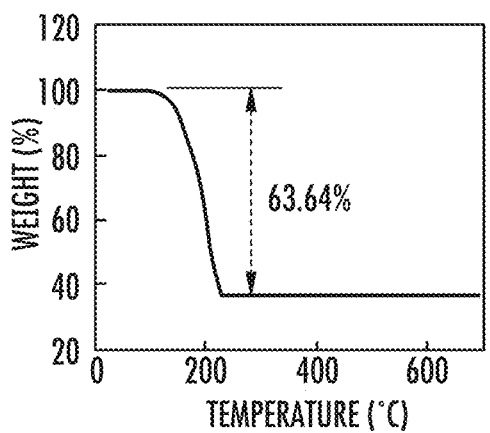
Figure 7:
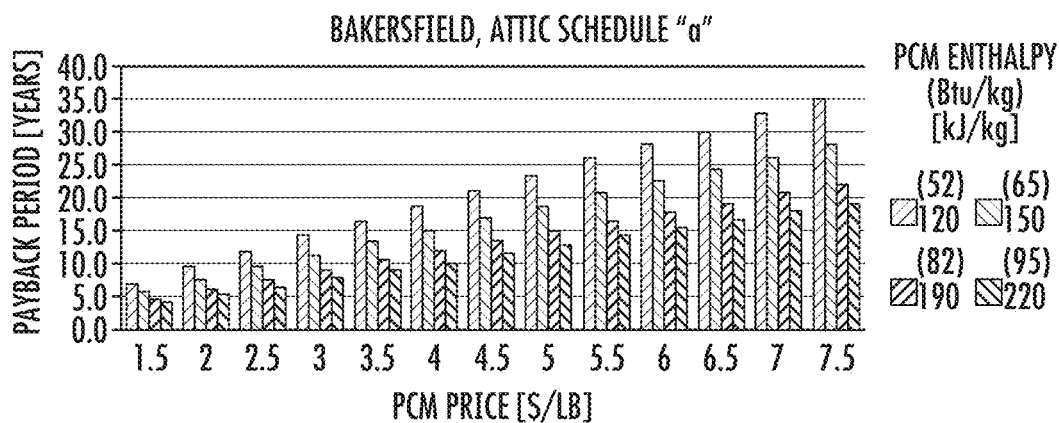
FIG. 7 is a graph of payback periods for the PCM-enhanced R-30 cellulose insulation configuration installed on the attic floor as a function of the PCM price for a single-story ranch house in Bakersfield, Calif. The external temperature profiles have been defined as "a".

FIG. 6B shows thermogravimetry analysis (TGA) results of unsealed CenoPCM. It can be seen that the CenoPCM starts to lose weight at 150° C. because PCM decomposes at this temperature. Since the cenospheres were not sealed, decomposed PCM vapor was quickly lost from the perforated cenospheres. This process continued until temperature reached 220° C. After this temperature, no further weight loss can be observed for the CenoPCM sample, suggesting that all PCM inside the perforated cenospheres had been evaporated. The residual weight of the sample is the weight of the perforated cenosphere shell. From the TGA measurement shown in FIG. 6B, it was found that: 1) the PCM accounts for 63.64% total weight of the produced CenoPCM, suggesting that cenosphere has very high absorption of PCMs; and 2) no decomposition occurred in the cenosphere shell within the testing temperature ranges (800° C.), suggesting that cenospheres have much higher thermal stability than polymer shells used in existing microencapsulated PCMs.

Example 3

Figures 5A, 5B, 5C, 5D:
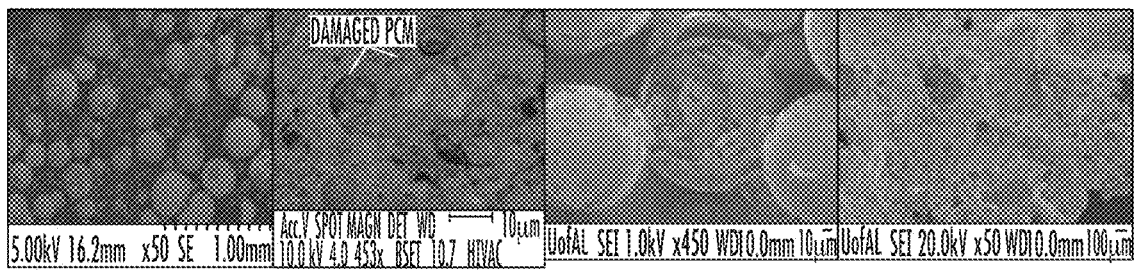
FIGS. 5A through 5D are SEM images that compare cenoPCMs with commercially available microencapsulated PCMs.

The compositions produced in Example 2 were combined into concrete. These cenospheres were compared with commercially available microencapsulated PCMs. FIG. 5A, shows that a commercially available microencapsulated PCM appears to a large extent deformed and broken, suggesting that a large portion of that product cannot survive during the mixing process of concrete (Hunger M, et al. The behavior of self-compacting concrete containing microencapsulated Phase Change Materials. *Cem Concr Compos* 2009; 31:731-43). Similarly, a large portion of another commercially available microencapsulated PCM can also be identified from FIG. 5B (Dehdezia P K, et al. Thermal, mechanical and microstructural analysis of concrete containing microencapsulated phase change materials. *International Journal of Pavement Engineering* 2013; 14:449-462).

FIG. 5C shows a broken cenoPCM particle. It can be seen clearly that PCM can be successfully loaded into the cenosphere shell.

FIG. 5D is the SEM image of the concrete added with 5% CenoPCM microcapsules. It can be seen that most of these particles are intact, verifying that the proposed CenoPCM has much higher strength than existing polymer based microencapsulated PCMs.

Table 2 shows the effect of adding 5% CenoPCM on the strength of concrete. It can be seen that 15% of strength reduction can be induced by CenoPCM. This is mainly caused by the PCM absorbed on the surface of the CenoPCM, which absorbs some mixing water in concrete and therefore reduces the workability of concrete. If we wash the CenoPCM better, this strength reduction will become insignificant. As comparison, after adding 0.5 wt %, 1 wt %, 3 wt % and 5 wt % CIBA's phase change materials microcapsules, the percentage reduction in strength is approximately 25%, 45%, 70% and 80% for addition, respectively.

TABLE 2

Strength reduction induced by CenoPCM addition

| | Age | | |
|---|---|---|---|
| | 3 days | 7 days | 28 days |
| Without CenoPCM (psi) | 4666 | 5340 | 7368 |
| With CenoPCM (psi) | 3914 | 4837 | 6219 |
| Reduced (%) | 16 | 13 | 15 |

Example 4

A mesoporous thin film can be coated on the surface of the loaded, perforated cenosphere. This can reduce the permeability of the cenosphere wall for applications requiring very slow release or sealing of the admixture, and enhance the mechanical performance of concrete. The thin film can be silica, alumina, or titania, which can provide a self-cleaning function to the concrete. This thin layer coating can be applied before or after the loading of the admixture, depending on the nature of the intended application.

The sol-gel method can be used to prepare a silica nanoparticle solution because of its low cost and ease of implementation. Tetraethoxysilane (TEOS) can be the precursor for sol-gel synthesis since it reacts readily with water with either a basic or acidic catalyst. The process comprise a series of hydrolysis and condensation reactions of the TEOS (FIG. 8). Sol-gel reactions do not require extreme reaction conditions. The reactions can take place at room temperature and require only moderate temperatures to cure the gel, which can easily remove the excess materials generated by the reaction.

In a specific method, silica sol can be first prepared through hydrolysis of TEOS with ammonium hydroxide or a nitric acid solution as catalyst. Then a simple dip coating method can be used to apply the silica sol on the surface of cenospheres to form a porous thin film of nanosilica. The permeability of this thin film can be determined by the packing properties of the nanosilica, which can be controlled by the concentration of the precursor and the pH value of the sol. In other words, the loading/releasing properties of the nanosilica coated cenosphere can be further modified by adjusting the concentration of TEOS and pH value of the sol.

Nanosilica particles can not only have pozzolanic reaction with calcium hydroxide, but also can serve as nucleating sites for the hydration reaction of cement to promote the production of CSH. As a result, a very dense interface transition zone between the cenosphere and cement paste can be produced. This dense interface can significantly increase the strength of the concrete. In addition, the produce dense interface transition zone can provide extra measure to prevent leaking of some admixture (e.g., PCM).

Coating the cenospheres with nanosilica thin films can also eliminate a drawback of traditional addition of nanoparticles as a dry powder additive to concrete—poor dispersion of the nanoparticle. Due to strong van der Waals forces between nanoparticles, nanoparticles tend to conglomerate. To achieve good dispersion of nanoparticles in concrete, strong physical blending using ultrasonic waves or chemical functionalization are commonly used. With the disclosed compositions, silica nanoparticles are directly grown on the surface of cenospheres. After homogeneously mixing these cenospheres into cement mixture, the silica nanoparticles are self-dispersed into the cement matrix. In this way, the time-consuming and difficult task of dispersing nanoparticles is eliminated.

Also, there is less risk of silica inhalation when the silica nanoparticles are coated on the cenosphere.

Figures 9A, 9B:
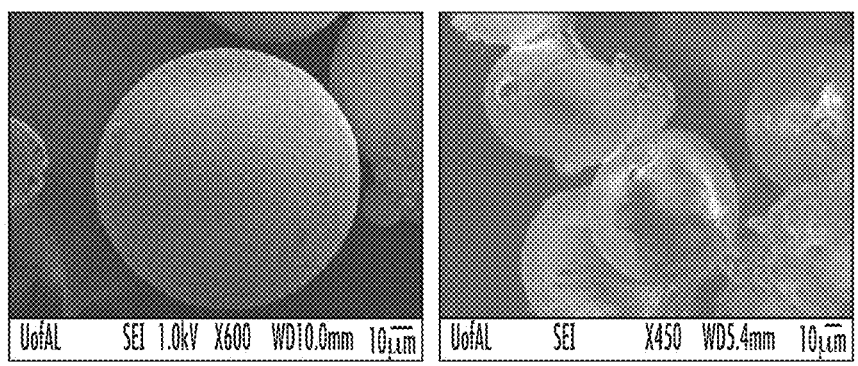
FIGS. 9A and 9B are graphs showing the coated CenoPCM.

FIG. 9A shows a CenoPCM coated with a thin layer of nanosilica through a sol-gel method.

Organic polymers can be coated on the perforated cenospheres though spray drying, fluidized bed, or other known techniques. FIG. 9B shows some perforated cenospheres with a polymer coating.

Example 5

Internal curing is a relatively new manufacturing method for high performance concrete. In this method, saturated LWAs or SAPs are typically used as water reservoirs to continuously supply water to replenish the empty pore volume that is created by self-desiccation. This will reduce autogenous shrinkage and also improve the curing of concrete at the early age. Thus, internal curing can be used to produce a dense crack-free microstructure, which is the desire of using a low water-to-cement ratio (w/c). Benefits of internal curing have also been shown to include reduced shrinkage of sealed concrete, increased compressive strength and flexural strength (especially at later ages), reduced potential for cracking and increased durability.

Figure 10:
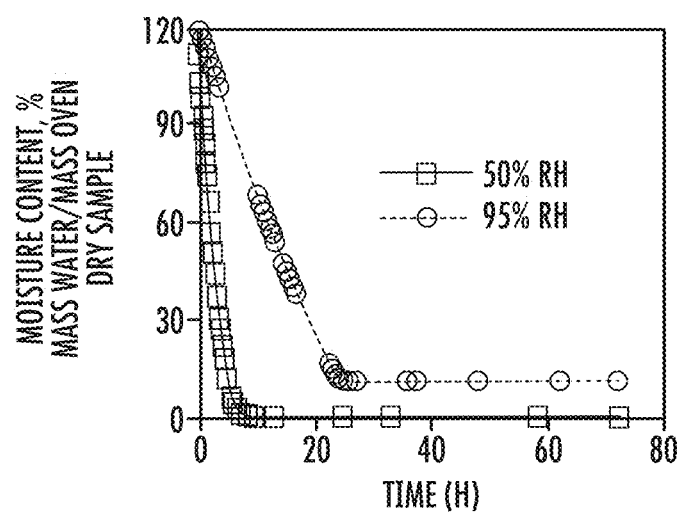
FIG. 10 is a graph of water released from perforated cenospheres.
Figures 11A, 11B, 11C:
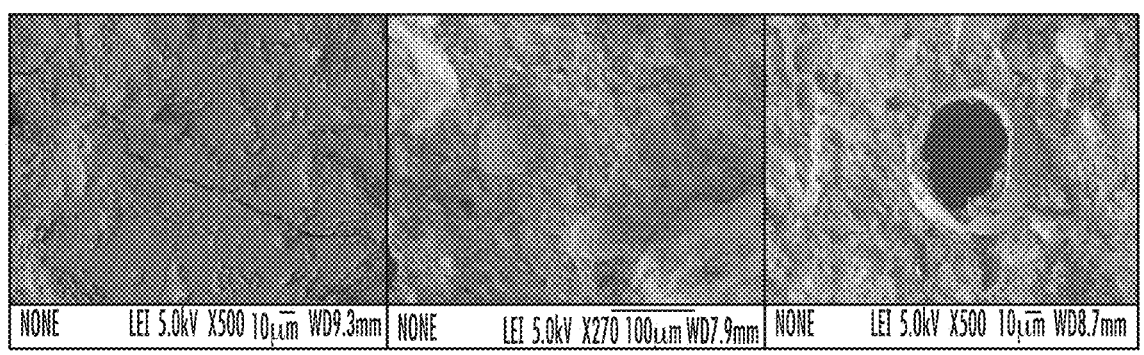
FIGS. 11A through 11C are SEM images of concrete with water to cement ratio=0.34 with and without cenospheres as internal curing agent.

When used in internal curing for concrete, water loaded within cenospheres has to be readily available to be released to the surrounding cementitious matrix in order to optimize internal curing of concrete. An ideal internal curing agent should release most of its absorbed water at high relative humidity within an appropriate time. In this example, the water release from the cenospheres at two different relative humidity levels: 50% and 95%, was performed. The results are shown in FIG. 10. It can be seen that even under high relative humidity (95%), more than 90% of loaded water can be released within 24 hours, suggesting that perforated cenospheres are an excellent internal curing agent. Direct observation of water movement during the first three days of the curing of a w/c=0.3 mortar specimen containing pre-wetted fine LWA shows that much of the water within the pre-wetted LWA departed during the first day of (rapid) hydration of the cementitious matrix. These data indicate that the release rate of water agrees with this rate. So water can not only be introduced into cenospheres, it can be properly released into cement matrix when needed. FIGS. 11A through 11C show SEM images of the microstructure of a concrete with water to cement ratio of 0.34 with and without cenospheres as internal curing agent. FIG. 11A is a concrete without internal curing with significant amount of drying shrinkage cracks. FIG. 11B is a concrete with cenospheres as internal curing agent showing cenospheres are evenly dispersed in concrete and much less drying shrinkage cracks. FIG. 11C is a broken cenosphere in concrete showing water is released and very dense hydration products around it. In addition, perforated cenospheres enjoy at least three additional advantages over existing internal curing agents such as LWAs or SAPs: 1) They have very high absorption (120% or even higher) which is much higher than lightweight aggregates (5~40%). A much smaller amount of cenospheres is needed to provide internal curing water; 2) They are very small in size. Therefore, a more spatially uniform distribution of internal curing water can be provided by cenospheres; 3) Cenospheres have pozzolanic reactivity, which will react with calcium hydroxide (CH) produced from cement hydration at late age.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of encapsulating a core material inside a cenosphere, the method comprising:
    contacting a cenosphere with an acid solution, thereby providing a perforated cenosphere;
    contacting the perforated cenosphere with the core material, thereby encapsulating the core material in the perforated cenosphere; and
    coating the perforated cenosphere encapsulating the core material with silica, alumina, or a polymer, wherein the coating is by spray drying;
    wherein the core material comprises a phase change material, and wherein the phase change material comprises a salt-water solution, a sugar alcohol, a paraffin, a fatty acid, a salt hydrate, a nitrate, a hydroxide, a hygroscopic material, or combinations thereof.

2. The method of claim 1, wherein the perforated cenosphere has an average diameter of from about 1 µm to about 2,000 µm.

3. The method of claim 1, wherein the phase change material comprises a fatty acid, a salt hydrate, or combinations thereof.

4. The method of claim 1, wherein the phase change material is paraffin wax.

5. The method of claim 1, wherein the core material further comprises water.

6. The method of claim 1, wherein the phase change material has a melting temperature of from $-100°$ C. to about $400°$ C.

7. The method of claim 1, wherein the phase change material has a melting enthalpy of from about 150 MJ/m$^3$ to about 300 MJ/m$^3$.

8. The method of claim 1, wherein the core material further comprises a concrete admixture.

9. The method of claim 1, wherein core material further comprises an antimicrobial agent, a fire retardant, a corrosion inhibitor, a viscosity modifier, superplasticizer, or air.

10. The method of claim 1, wherein the acid solution comprises ammonium fluoride and hydrochloric acid.

* * * * *

UNITED STATES PATENT AND TRADEMARK OFFICE
CERTIFICATE OF CORRECTION

PATENT NO. : 11,142,909 B2
APPLICATION NO. : 16/573457
DATED : October 12, 2021
INVENTOR(S) : Jialai Wang Page 1 of 1

It is certified that error appears in the above-identified patent and that said Letters Patent is hereby corrected as shown below:

In the Specification

Column 1, Line 17: Delete "23006" and insert -- 1000580 --

Column 1, Line 18: After "Foundation" insert -- and Grant No. DE-EE0008677 awarded by the Department of Energy --

Signed and Sealed this
Twenty-sixth Day of August, 2025

Coke Morgan Stewart
*Acting Director of the United States Patent and Trademark Office*